(12) United States Patent
McGraw (10) Patent No.: US 11,006,544 B1
(45) Date of Patent: May 11, 2021

(54) AUTOMATIC COMPONENT DISCOVERY MECHANISM

(71) Applicant: Hewlett Packard Enterprise Development LP, Houston, TX (US)

(72) Inventor: Montgomery Carl McGraw, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/703,636

(22) Filed: Dec. 4, 2019

(51) Int. Cl.
*H05K 7/14* (2006.01)
*G06F 21/44* (2013.01)

(52) U.S. Cl.
CPC .......... *H05K 7/1498* (2013.01); *G06F 21/44* (2013.01); *H05K 7/1487* (2013.01); *H05K 7/1491* (2013.01)

(58) Field of Classification Search
None
See application file for complete search history.

(56) References Cited

U.S. PATENT DOCUMENTS

| 9,565,269 | B2 | 2/2017 | Malwankar et al. |
| 10,176,116 | B2 | 1/2019 | Sternberg et al. |
| 2007/0083723 | A1* | 4/2007 | Dey .................... H04L 61/2038 711/163 |
| 2009/0089624 | A1* | 4/2009 | Austen .................... G06F 11/30 714/39 |
| 2016/0085718 | A1 | 3/2016 | Huang |
| 2017/0164077 | A1* | 6/2017 | Goodrum ........... H04Q 11/0071 |

OTHER PUBLICATIONS

E. Smith, "NVMe Over Fabrics' Discovery Problem," Dec. 7, 2017, pp. 1-3 (online), Retrieved from the Internet on Apr. 18, 2019 at URL: <brasstacksblog.typepad.com/brass-tacks/2017/.
Jeff Shao, "Ethernet Storage Fabric—Part 1," May 22, 2018, pp. 1-3 (online), Retrieved from the Internet on Apr. 18, 2019 at URL: <mellanox.com/blog/2018/05/ethernet-storage-fabr.

* cited by examiner

*Primary Examiner* — Carlos Garcia
(74) *Attorney, Agent, or Firm* — Jaffery Watson Mendonsa & Hamilton (57) ABSTRACT

A system to facilitate automatic data center assembly is described. The system includes a first enclosure, including a first set of components, each component including a component manager to perform a component function and a first enclosure manager, communicatively coupled to each component manager, to perform a discovery of each of the first set of components and discover one or more adjacent enclosures coupled to the enclosure via link cables. The system also includes a system manager to automatically discover the first enclosure via the first enclosure manager and discover each of the first set of plurality of components via an associated component manager.

20 Claims, 8 Drawing Sheets

AUTOMATIC COMPONENT DISCOVERY MECHANISM

BACKGROUND

Data centers house computer systems and associated components, such as storage systems. For instance, data centers may include redundant or backup components and infrastructure for power supply, data communications connections and various security devices. However, installation and setup of data centers requires significant planning, and is accomplished via manual setup of storage systems, manual configuration of shared storage on each server, and manual configuration of switches, which typically requires coordination of three different administrators (e.g., server, storage and networking).

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

In embodiments, a mechanism is provided to facilitate discovery of components within a data center. In such embodiments, the data center includes various enclosures, each including one or more components and an enclosure manager configured to discover each component, as well as one or more adjacent enclosures coupled via link cables. The data center also includes a system manager to automatically discover the enclosures via the enclosure managers and each component within the enclosures. In further embodiments, the system manager discovers non-volatile memory express (NVMe) over Fabric capabilities for each component within the first and second enclosure and provisions operation on each component discovered to have (NVMe) over Fabric capabilities.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
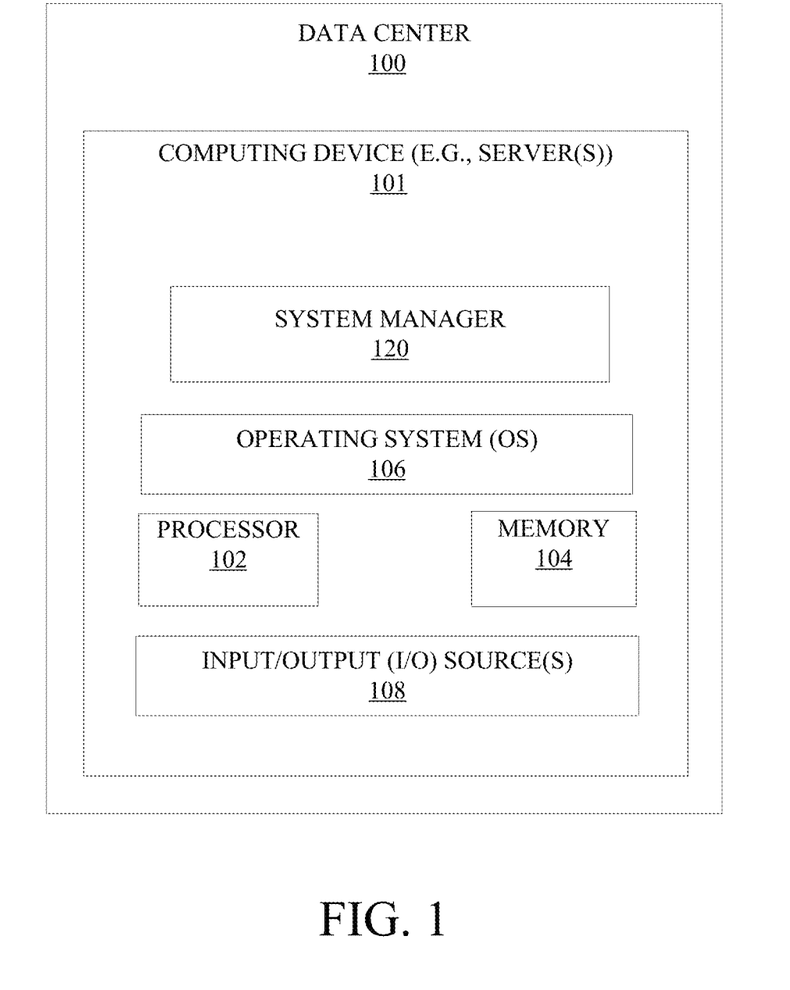
FIG. 1 illustrates one embodiment of a system employing a data center.

FIG. 1 illustrates one embodiment of a data center 100. As shown in FIG. 1, data center 100 includes one or more computing devices 101 that may be server computers serving as a host for data center 100. In embodiments, computing device 101 may include (without limitation) server computers (e.g., cloud server computers, etc.), desktop computers, cluster-based computers, set-top boxes (e.g., Internet-based cable television set-top boxes, etc.), etc. Computing device 101 includes an operating system ("OS") 106 serving as an interface between one or more hardware/physical resources of computing device 101 and one or more client devices, not shown. Computing device 101 further includes processor(s) 102, memory 104, input/output ("I/O") sources 108, such as touchscreens, touch panels, touch pads, virtual or regular keyboards, virtual or regular mice, etc.

In one embodiment, computing device 101 includes one or more server computers that may be further in communication with one or more databases or storage repositories, which may be located locally or remotely over one or more networks (e.g., cloud network, Internet, proximity network, intranet, Internet of Things ("IoT"), Cloud of Things ("CoT"), etc.). Computing device 101 may be in communication with any number and type of other computing devices via one or more networks.

Figure 2:
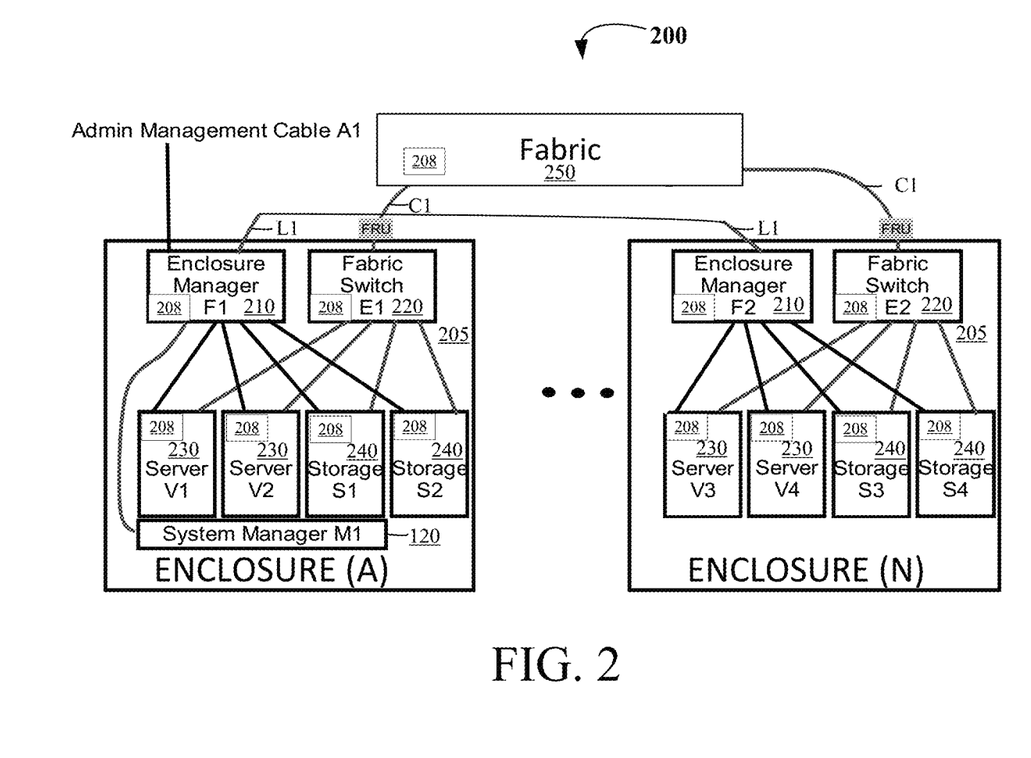
FIG. 2 illustrate another embodiment of a data center system.

According to one embodiment, computing device 101 implements a system manager 120 to facilitate automatic discovery and authentication of components within data center 100. In a further embodiment system manager 120 also facilitates automatic discovery and provisioning of non-volatile memory express (NVMe) over Fabric devices within data center 100. FIG. 2 illustrates one embodiment of a system 200 for which system manager 120 provides automatic component discovery authentication.

As shown in FIG. 2, system 200 comprises two or more enclosures, such as enclosures 205 (e.g., Enclosure(A)-Enclosure(N)), each including various components. In one embodiment, Enclosures (A-N) may be located in the same rack. However in other embodiments, one or more of the enclosures may be located in different racks. In a further embodiment, each enclosure 205 includes components comprising of a fabric switch 220, one or more servers (e.g., V1 and V2, and B3 and V4) 230 and one or more storage devices (e.g., S1 and S2, and S3 and S4) 240. According to one embodiment, fabric switches 220 couple each of the racks 205 to one or more fabrics 250. In a further embodiment, fabric switches 220 are coupled to servers 230 and storage devices 240 via direct connect fabric cables C1.

Each server 230 may operate as compute nodes to store and access encrypted data over fabrics 250 to the storage devices 240 in which servers 230 may initiate a process that results in the secure storage or retrieval of data from the storage devices 240. Accordingly, the servers 230 are referred to herein as initiators. The storage devices 240 may be considered the targets of initiators' requests to store and retrieve data. Accordingly, the storage devices 240 are also referred to herein as targets. In on embodiment, storage devices 240 comprise non-volatile memory express (NVMe) external storage.

According to one embodiment, each enclosure 205 component, as well as fabric 250, includes a component manager 208. In such an embodiment, component managers 208 comprise a field replaceable unit (FRU) having at least one processor, a network interface and memory device implemented to discover and communicate with all components (e.g., component functions and/or capabilities) within the enclosure in which the component manager 208 is associated. Thus, a FRU includes product information that enables a component manager 208 to identify itself. For instance, upon powering up a component manager 208 within a server 230 automatically accesses its internal memory to discover the server 230 is the only component within the enclosure, while the component manager 208 associated with an enclosure 205 accesses its internal memory to discover all of the respective components (e.g., fabric switch 220, servers 230 and storage devices 240) within enclosure 205. In a further embodiment, each component manager 208 generates a management network address after discovery and provides an application program interface (API) for controlling the component.

In one embodiment, each enclosure 205 also includes an enclosure manager 210 communicatively coupled to each component manager 208. Similar to the component managers 208, an enclosure manager 210 automatically discovers all components within an enclosure 205. Thus, an enclosure manager 210 is the component manager for enclosure 205. In one embodiment, enclosure manager 210 discovers components via component mangers 208 using network discovery protocols, such as Link Layer Discovery Protocol (LLDP) or Simple Service Discovery Protocol (SSDP). In a further embodiment, an enclosure manager 210 may be implemented to manage power and cooling within an enclosure 205. Additionally, enclosure manager 210 automatically generates a management network address and provides an API for controlling the enclosure upon powering up.

In yet a further embodiment, each enclosure manager 210 is coupled to adjacent enclosure managers 210 within data center 200. In such an embodiment, an enclosure manager 210 discovers adjacent enclosures (e.g., an enclosure 205) via one or more system link cable(s) L1 using network discovery protocols, (e.g., (LLDP) or (SSDP)). In still a further embodiment, a component manager 208 may operate as an enclosure manager for single component enclosures (e.g., stand-alone components).

Enclosure 205 also includes system manager 120 to automatically discover (e.g., via network discovery protocols) and authenticate all enclosure managers 210 within data center 200 via the enclosure interfaces. Once authenticated, system manager 120 takes control of all the enclosures connected via the system link cables L1 and enclosure APIs. Subsequently, system manager 120 discovers all enclosure 205 components via the enclosure manager 210 API of each linked enclosure. In one embodiment, system manager 120 uses the component manager 208 API for each discovered component in the enclosure 205 to authenticate and take control of the respective components. Thus, system manager 120 authenticates and takes control of fabric switch 220, servers 230 and storage devices 240 within racks 205. Although shown as being included in Enclosure A, other embodiments may feature system manager being implemented as a stand-alone enclosure and coupled to an enclosure manager 210 within one or more enclosures 205.

According to one embodiment, system manager 120 is also configured to discover NVMe over Fabric capabilities from switch 220, servers 230 and storage devices 240. In such an embodiment, system manager 120 discovers cabling between switches 220 by matching associated FRU information on each end of cables C1 between switches 220 in data center 200. System manager 120 uses identifiers stored in a component manager 208 FRU to find the C1 cabling (e.g., a direct attach copper cable). For example, system manager 120 accesses a fabric switch 220 to determine whether the switch 220 has a cable with an associated identifier.

System manager 120 then use policies to determine whether the system has met the requirements to provide NVMe over Fabric (e.g., does an enclosure 205 have servers 230 connected to a switch 220 that connects to a storage 240). Thus, a policy may be implemented to show that a cable is missing (e.g., found two racks 205 based on a link cable connected between racks 205, but cannot find a cable C1 between switches 220). In one embodiment, system manager 120 may provide error messages and suggested steps to resolve the requirements to provide NVMe over Fabric.

According to one embodiment, system manager 120 may provide automatic provisioning for NVMe over Fabric. In such an embodiment, a system administrator may transmit NVMe over Fabric requirements to system manager 120 via an administrative management cable A1 coupled to enclosure manager 210. System manager 120 may then satisfy the requirements by configuring the storage devices 240 and switches 220 to connect to the required servers 230, using specific NVMe drive(s) identifier(s) and fabric topology, and ensuring that a server adapter is configured to complete the requirements request.

For example, system manager 120 may begin with storage to meet the requirement (e.g., select drives X, Y and Z from storage devices 240 S2), and configure switch 220 to grant access to those drives to server 230 V1. Subsequently, system manager 120 updates a server adapter with the address needed to access the storage device 240 and the identifier of the drives. Subsequently, system manager 120 updates the information on the new NVMe over Fabric assignments and removes those NVMe drive(s) from the available resource pool.

According to one embodiment, enclosure 205 comprises a blade server enclosure having a plurality of blade servers. In such an embodiment, each blade server includes a component manager FRU that discovers its component functions and/or capabilities upon being powered up. Each blade server generates a management network address after discovery, and provides an API to be controlled by system manager 120. Additionally, the blade server enclosure includes an enclosure manager to discover each of the blade servers via the component manager, generate a management network address and provide an enclosure API to be controlled by system manager 120. The blade server enclosure manager also discovers neighboring enclosures via the enclosure managers within the neighboring enclosures. Once all of the APIs have been provided, system manager 120 may then control each blade server and the blade server enclosure via the respective APIs.

Figure 3:
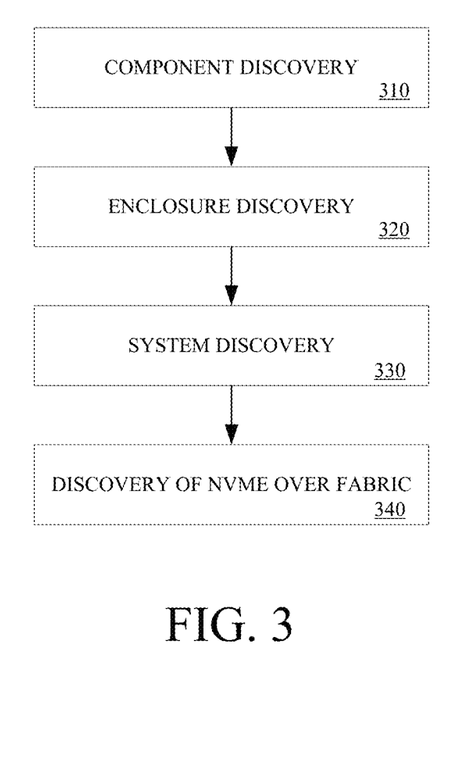
FIG. 3 is a flow diagram illustrating one embodiment of a discover process.
Figure 4:
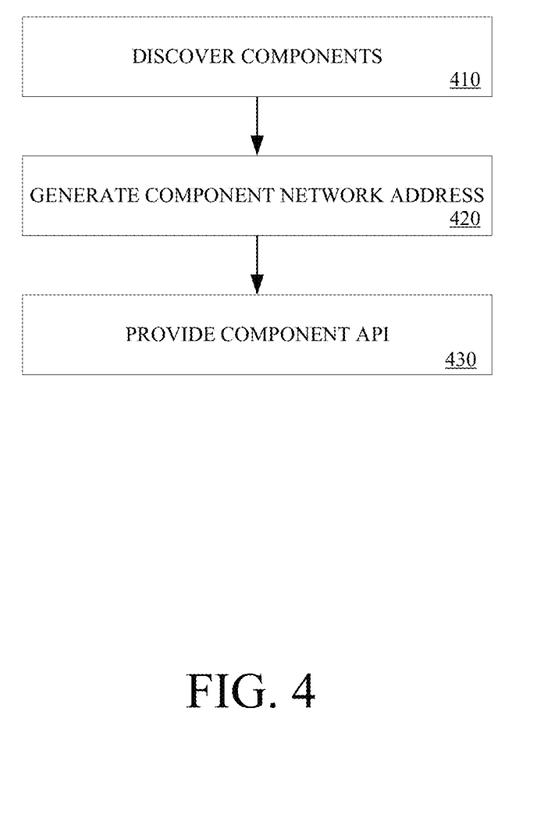
FIG. 4 is a flow diagram illustrating one embodiment of an enclosure discovery process.

FIG. 3 is a flow diagram illustrating one embodiment of a discover process. At processing block 310, component discovery is performed. FIG. 4 is a flow diagram illustrating one embodiment of a component discovery process. At processing block 410, the component manager automatically discovers all components within the component's enclosure (e.g., sub-components). As discussed above, a rack component manager may discover all components and component capabilities within the rack, while a server component manager will discover the capabilities of the server. At processing block 420, the component manager automatically generates a component management network address. At processing block 430, the enclosure manager provides an API for controlling the component (or component API).

Figure 5:
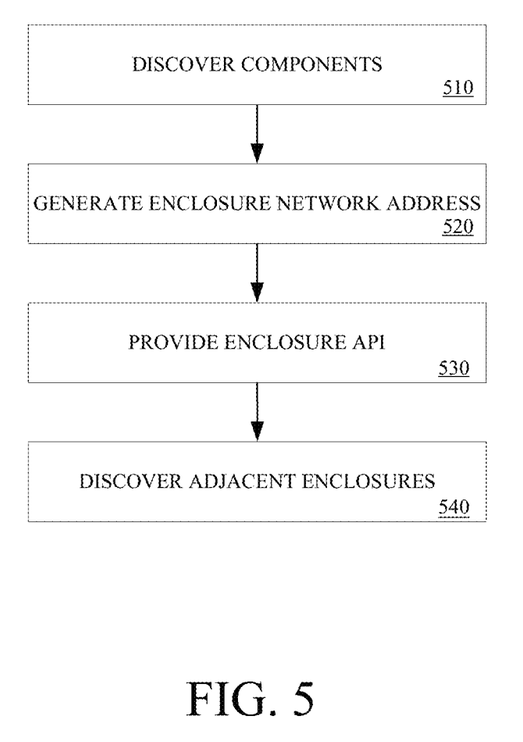
FIG. 5 is a flow diagram illustrating one embodiment of a component discovery process.

Referring back to FIG. 3, enclosure discovery is performed once component discovery has been performed, processing block 320. FIG. 5 is a flow diagram illustrating one embodiment of an enclosure discovery process. At processing block 510, the enclosure manager discovers all component(s) in an enclosure (e.g., rack). At processing block 520, the enclosure manager automatically generates an enclosure management network address. At processing block 530, the enclosure manager provides an API for controlling the enclosure (or enclosure API). At processing block 540, the enclosure manager discovers adjacent enclosures via one or more link cables L1 using network discovery protocols.

Figure 6:
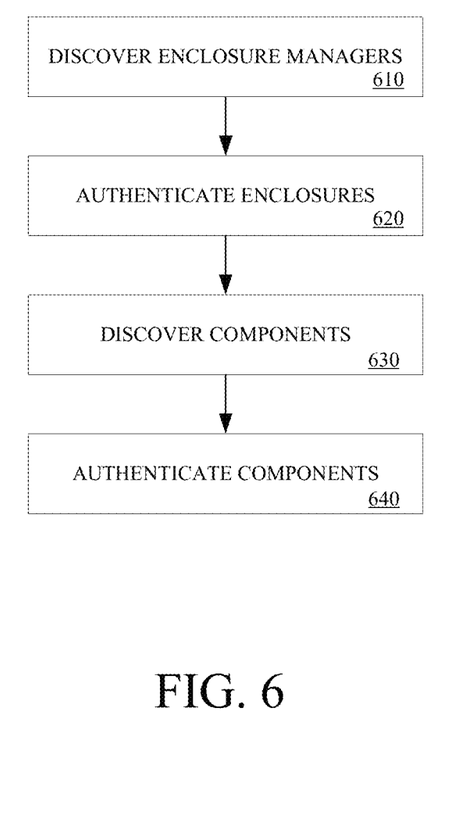
FIG. 6 is a flow diagram illustrating one embodiment of a system discovery process.

Referring back to FIG. 3, system discovery is performed once component and enclosure discovery has been performed, processing block 330. FIG. 6 is a flow diagram illustrating one embodiment of a system discovery process. At processing block 610, the system manager automatically discovers all enclosure managers via network discovery protocols. At processing block 620, the system manager authenticates all enclosures connected via system link cables, and subsequently takes control of the enclosures. At processing block 630, the system manager discovers all of the components of the system through the enclosure manager API of each linked enclosure. At processing block 640, the system manager uses the component manager API for each discovered component to authenticate the components, and subsequently takes control of all the components of the system.

Figure 7:
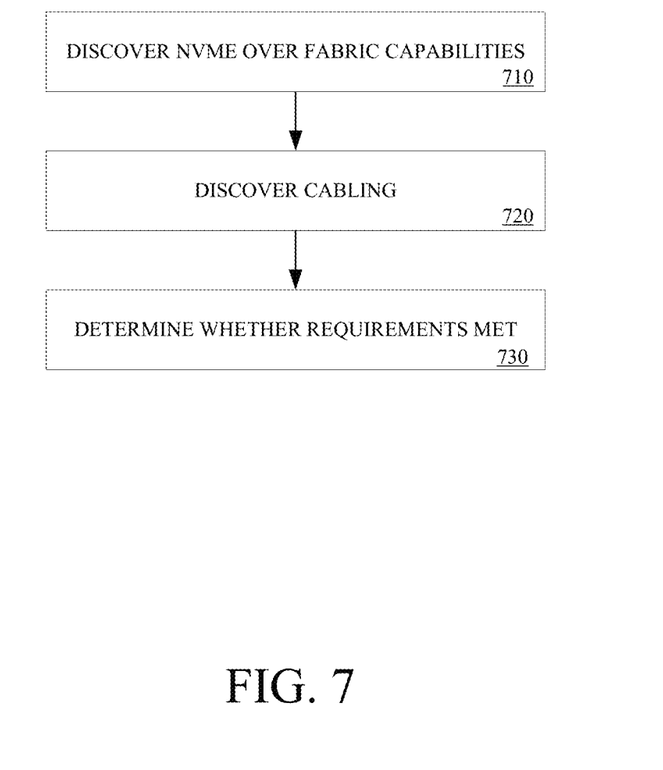
FIG. 7 is a flow diagram illustrating one embodiment of a non-volatile memory express (NVMe) over Fabric discovery process.

Referring back to FIG. 3, system discovery of NVMe over Fabric is performed once system discovery has been performed, processing block 340. FIG. 7 is a flow diagram illustrating one embodiment of a NVMe over Fabric discovery process. At processing block 710, the system manager discovers NVMe over Fabric capabilities from all servers, storage devices and switches. At processing block 720, the system manager discovers cabling between switches by matching cable C1 FRU information on each end of directly attached cables between switches in the system. At processing block 730, the system manager uses policies to determine whether the system has met the requirements to provide NVMe over Fabric. In one embodiment, the system manager automatically provides error messages and suggested resolution steps upon a determination that the system has not met the requirements to provide NVMe over Fabric.

Figure 8:
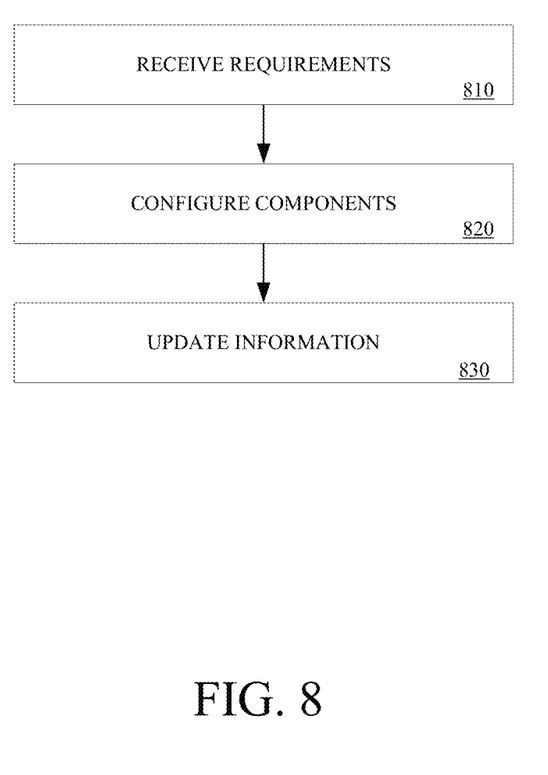
FIG. 8 is a flow diagram illustrating one embodiment of a provisioning process.

Once NVMe over Fabric discovery is performed, automatic provisioning may be performed. FIG. 8 is a flow diagram illustrating one embodiment of a provisioning process. At processing block 810, the system manager receives an NVMe over Fabric requirements request from an administrator. At processing block 820, the system manager satisfies those requirements by configuring storage devices and switches to connect to one or more servers to be implemented (or required) to satisfy the requirements. In one embodiment, the system manager uses specific NVMe drive identifiers and fabric topology, and ensures that a server adapter is configured to complete the requirements request. At processing block 830, the system manager updates the information on the new NVMe over Fabric assignments and removes those NVMe drive(s) from an available resource pool.

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system to facilitate data center assembly, comprising:
 a first enclosure, including:

a first set of components, each component including a component manager to perform a discovery of the component;

a first enclosure manager, communicatively coupled to each component manager, to perform a discovery of each of the first set of components via the component managers and discover one or more adjacent enclosures coupled to the enclosure via link cables; and a system manager to automatically discover the first enclosure via the first enclosure manager and discover each of the first set of plurality of components via an associated component manager.

2. The system of claim 1, wherein each component manager automatically generates a component management network address for a component and provides a component interface to facilitate communication with the system manager.

3. The system of claim 2, wherein the first enclosure manager automatically generates an enclosure management network address for the enclosure and provides an enclosure interface to facilitate communication with the system manager.

4. The system of claim 3, wherein the system manager authenticates and asserts control over the first enclosure manager via the enclosure interface and each component manager via the component interfaces.

5. The system of claim 2, wherein the first enclosure manager controls the first set of components via the enclosure interface.

6. The system of claim 1, wherein the one or more adjacent enclosures comprises:
a second enclosure, including:
a second set of plurality of components, each including a component manager to perform a discovery of component function; and
a second enclosure manager, communicatively coupled to each component manager, to perform a discovery of each of the second set of components and discover the first enclosure via a first link cable,
wherein the system manager automatically discovers the second enclosure via the second enclosure manager and discover each of the second set of plurality of components via an associated component manager.

7. The system of claim 6, wherein the system manager discovers non-volatile memory express (NVMe) over Fabric capabilities for each component within the first and second enclosures.

8. The system of claim 7, wherein the system manager performs a provisioning operation on each component discovered to have NVMe over Fabric capabilities.

9. A method to facilitate data center assembly, comprising:
an enclosure manager providing an enclosure interface for controlling the first enclosure;
a component manager associated with each of a plurality of components providing a component interface for each of the plurality of components;
the enclosure manager performing a discovery of each of the plurality of components via the component managers; and a system manager to automatically discover the first enclosure via the enclosure interface and discover each of the plurality of components via the component interface for each of the plurality of components.

10. The method of claim 9, further comprising:
the system manager authenticating the first enclosure manager via the enclosure interface; and
the system manager controlling the first enclosure manager.

11. The method of claim 10, further comprising:
the system manager authenticating each of the plurality of components via the component interface for each of the plurality of components; and
the system manager controlling each of the plurality of components.

12. The method of claim 9, further comprising the system manager discovering non-volatile memory express (NVMe) over Fabric capabilities for each of the plurality of components.

13. The method of claim 12, further comprising the system manager performing a provisioning operation on each component discovered to have NVMe over Fabric capabilities.

14. A data center, comprising:
a plurality of enclosures, including:
a first enclosure, including:
a first set of components, each having a component manager to perform a discovery of the component;
a first enclosure manager to perform a discovery of each of the first set of components within the enclosure via the component managers and discover one or more adjacent enclosures coupled to the enclosure via link cables; and
a system manager to automatically discover each of the plurality of enclosures via the enclosure manager and discover each of the set of components within the plurality of enclosures via the component managers.

15. The data center of claim 14, wherein each component manager generates a component management network address for a component and provides a component interface to facilitate communication with the system manager.

16. The data center of claim 15, wherein the system manager authenticates and asserts control over the first enclosure manager via the enclosure interface and each component manager via the component interfaces.

17. The data center of claim 14, wherein the system manager discovers non-volatile memory express (NVMe) over Fabric capabilities for each component within the first and second enclosures.

18. The data center of claim 17, wherein the system manager performs a provisioning operation on each component discovered to have NVMe over Fabric capabilities.

19. The data center of claim 18, wherein the system manager performing the provisioning operation comprises receiving a request from an administrator, configuring one or more storage devices and switches to connect to one or more servers to implement NVMe over Fabric requirements.

20. The data center of claim 14, wherein each component manager and each enclosure manager comprises a field replaceable unit (FRU) having at least one processor and memory device.

* * * * *